United States Patent
Oliveira Lizardo et al.

(10) Patent No.: US 11,294,892 B2
(45) Date of Patent: Apr. 5, 2022

(54) VIRTUAL ARCHIVING OF DATABASE RECORDS

(71) Applicant: INTERNATIONAL BUSINESS MACHINES CORPORATION, Armonk, NY (US)

(72) Inventors: Luis Eduardo Oliveira Lizardo, Böblingen (DE); Felix Beier, Haigerloch (DE); Knut Stolze, Hummelshain (DE); Reinhold Geiselhart, Rottenburg-Ergenzing (DE)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 16/946,515

(22) Filed: Jun. 25, 2020

(65) Prior Publication Data
US 2021/0406259 A1 Dec. 30, 2021

(51) Int. Cl.
*G06F 16/242* (2019.01)
*G06F 16/22* (2019.01)
*G06F 16/11* (2019.01)
*G06F 16/23* (2019.01)
*G06F 16/25* (2019.01)

(52) U.S. Cl.
CPC ........ *G06F 16/2423* (2019.01); *G06F 16/113* (2019.01); *G06F 16/221* (2019.01); *G06F 16/2282* (2019.01); *G06F 16/2329* (2019.01); *G06F 16/256* (2019.01)

(58) Field of Classification Search
CPC ............. G06F 16/2423; G06F 16/2329; G06F 16/113; G06F 16/221; G06F 16/2282; G06F 16/256
See application file for complete search history.

(56) References Cited

U.S. PATENT DOCUMENTS

| | | | |
|---|---|---|---|
| 8,051,045 B2 | 11/2011 | Vogler | |
| 9,286,300 B2 | 3/2016 | Draese | |
| 9,483,213 B1 * | 11/2016 | Wharton | ............... G06F 3/0605 |

(Continued)

OTHER PUBLICATIONS

Beier, Felix et al.; Architecture of a data analytics service in hybrid cloud environments; De Gruyter Oldenbourg it—Information Technology 2017; May 29, 2017; 8 pages.

Beier, Felix, et al.; Extending database accelerators for data transformations and predictive analytics; Advances in database technology—EDBT 2016: 19th International Conference on Extending Database Technology; Mar. 15-18, 2016.

(Continued)

*Primary Examiner* — Dangelino N Gortayo
(74) *Attorney, Agent, or Firm* — Schmeiser, Olsen & Watts; Stephanie Carusillo (57) ABSTRACT

A database-management system (DBMS) archives a record of a database table by updating the record's unique "Archived" field. This indicates that the record should be considered to have been archived despite the fact that the record has not been physically moved to a distinct archival storage area. When a query requests access to the table, the DBMS determines whether the query requests access to only archived data, only active data, or both. If both, the DBMS searches the entire table. Otherwise, the DBMS scans each record's Archived field to consider only those records that satisfy the query's requirement for either archived or active data. If the DBMS incorporates Multi-Version Concurrency Control (MVCC) technology, the DBMS combines this procedure with MVCC's time-based version-selection mechanism.

20 Claims, 7 Drawing Sheets

(56) References Cited

U.S. PATENT DOCUMENTS

| | | | |
|---|---|---|---|
| 9,626,377 B1* | 4/2017 | Bent | G06F 16/10 |
| 10,013,312 B2 | 7/2018 | Broll | |
| 10,216,739 B2 | 2/2019 | Broll | |
| 10,795,777 B1* | 10/2020 | Goyal | G06F 11/1464 |
| 2011/0185130 A1* | 7/2011 | Hara | G06F 3/0631 |
| | | | 711/154 |
| 2012/0197845 A1* | 8/2012 | Kim | G06F 16/185 |
| | | | 707/662 |
| 2013/0110779 A1* | 5/2013 | Taylor | G06F 16/1844 |
| | | | 707/624 |
| 2016/0210316 A1 | 7/2016 | Bendel | |
| 2021/0019093 A1* | 1/2021 | Karr | G06F 3/0608 |

OTHER PUBLICATIONS

Goksu, Mehmet Cuneyt et al.; Managing Ever-Increasing Amounts of Data with IBM DB2 for z/OS Using Temporal Data Management, Archive Transparency, and the DB2 Analytics Accelerator; Redbooks; http://www.redbooks.ibm.com/redbooks/pdfs/sg248316.pdf; Sep. 2015; 204 pages.

Poor Men's Multi-Version Concurrency Control (MVCC); Introduction to Multi-Version Concurrency Control (The Real Thing); https://pages.github.ibm.com/Everest/IDAA-Server/#/concepts/mvcc; retrieved from the Internet May 13, 2020; 16 pages.

Wikipedia; Multiversion concurrency control; https://en.wikipedia.org/wiki/Multiversion_concurrency_control; retrieved from the Internet May 13, 2020; last updateed Apr. 22, 2020; 4 pages.

Mell, Peter et al.; "The NIST Definition of Cloud Computing;" National Institute of Standards and Technology; Special Publication 800-145; Sep. 2011; 7 pages.

* cited by examiner

*Prior Art*

*Prior Art*

VIRTUAL ARCHIVING OF DATABASE RECORDS

BACKGROUND

The present invention relates in general to computerized data storage and in particular to the efficient storage and retrieval of archived data.

Archived data generally consists of older information that, despite being less frequently accessed, must still be accessible. Data archiving is the process of reducing long-term storage costs by migrating such data to lower-cost, lower-performance media. This requires the ability to inventory production data in order to identify which data items are the best candidates for archiving.

SUMMARY

Embodiments of the present invention comprise systems, methods, and computer program products for a database-management system (DBMS) comprising a virtual archiving system that archives database records in a table in which the records were stored prior to archiving, rather than moving the archived records to a distinct archive repository. The DBMS archives a record by updating a unique "Archived" field added to each record of the database. This updating indicates that the record should be considered to have been archived despite the fact that the record has not been physically moved to a distinct storage area reserved for archived data. When a query, or other type of data-access request, requests access to the table, the DBMS determines whether the query requests access to only archived data, to only active data, or to both. If both, the DBMS generates a result set that is selected from all records of the table. Otherwise, the DBMS scans each record's Archived field and selects records of the result set from only those records that satisfy the query's requirement for either archived or active data. If the DBMS incorporates Multi-Version Concurrency Control (MVCC) technology, the DBMS combines this procedure with MVCC's version-tracking mechanism.

DETAILED DESCRIPTION

In known database-management systems (DBMSs), less-frequently accessed data is archived to a separate partition or table, which may be stored on a lower-performance, lower-cost tier of storage. DBMS users are generally given the choice of querying only archived data, only non-archived data (such as actively maintained production data), or both.

This approach is cumbersome because it divides data among multiple partitions or other types of data-storage repositories, forcing the DBMS to search through archive partitions when a query requests access to archived data. Managing multiple tables adds complexity and wastes storage space on redundant table metadata.

Worse, queries that search both archived and non-archived data require a DBMS's query optimizer component to select an execution plan that joins the contents of active and archive partitions into a single data repository prior to searching the combined contents. Generating, storing, and otherwise processing the combined repository can then further reduce performance and require additional resources. For example, in an SQL (Structured Query Language) database, this mechanism might require the optimizer to perform a resource-intensive UNION ALL operation that can impose an especially challenging burden when processing large real-world databases.

Embodiments of the present invention improve current DBMSs by storing both archived and non-archived data in a single database table, allocating each class of data into a virtual partition of the same table. When a record is "archived," the improved DBMS does not delete the archived record from the table or move the record to a separate table or database. Instead, the DBMS time-stamps the record with the time of the archiving and flags the record as having been archived.

The improved DBMS mechanism adds an "Archived" column or field to each row or record stored in the database table. This column may be used by the DBMS, as an index or as any other sort of search criteria, to distinguish active records from records that have been archived to a logical or virtual "partition" of the table. Despite this distinction, both archived and non-archived records are actually stored in the same table, eliminating the need to perform a UNION ALL-type operation on distinct archive and active tables when querying a combination of archived and non-archived data.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
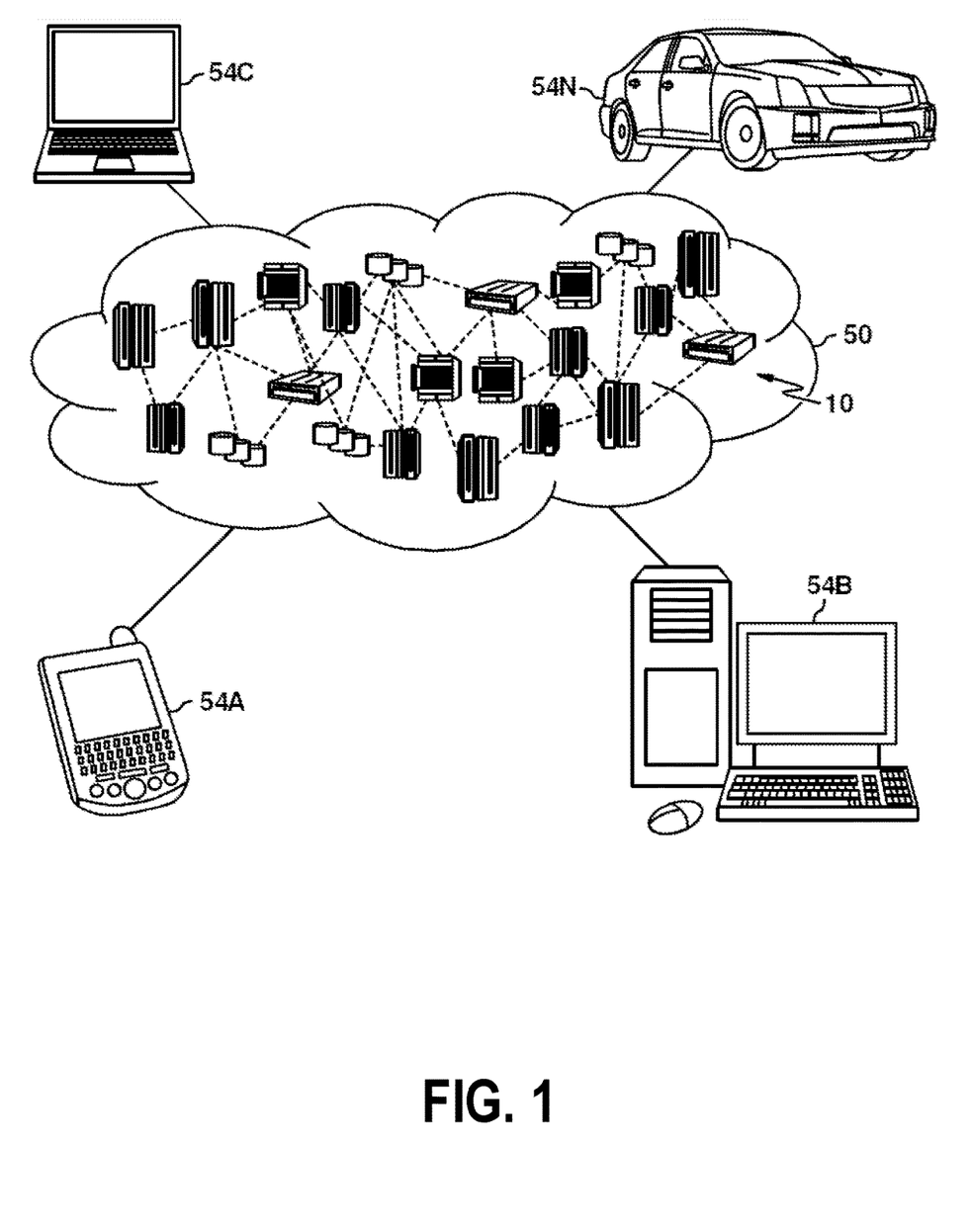
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
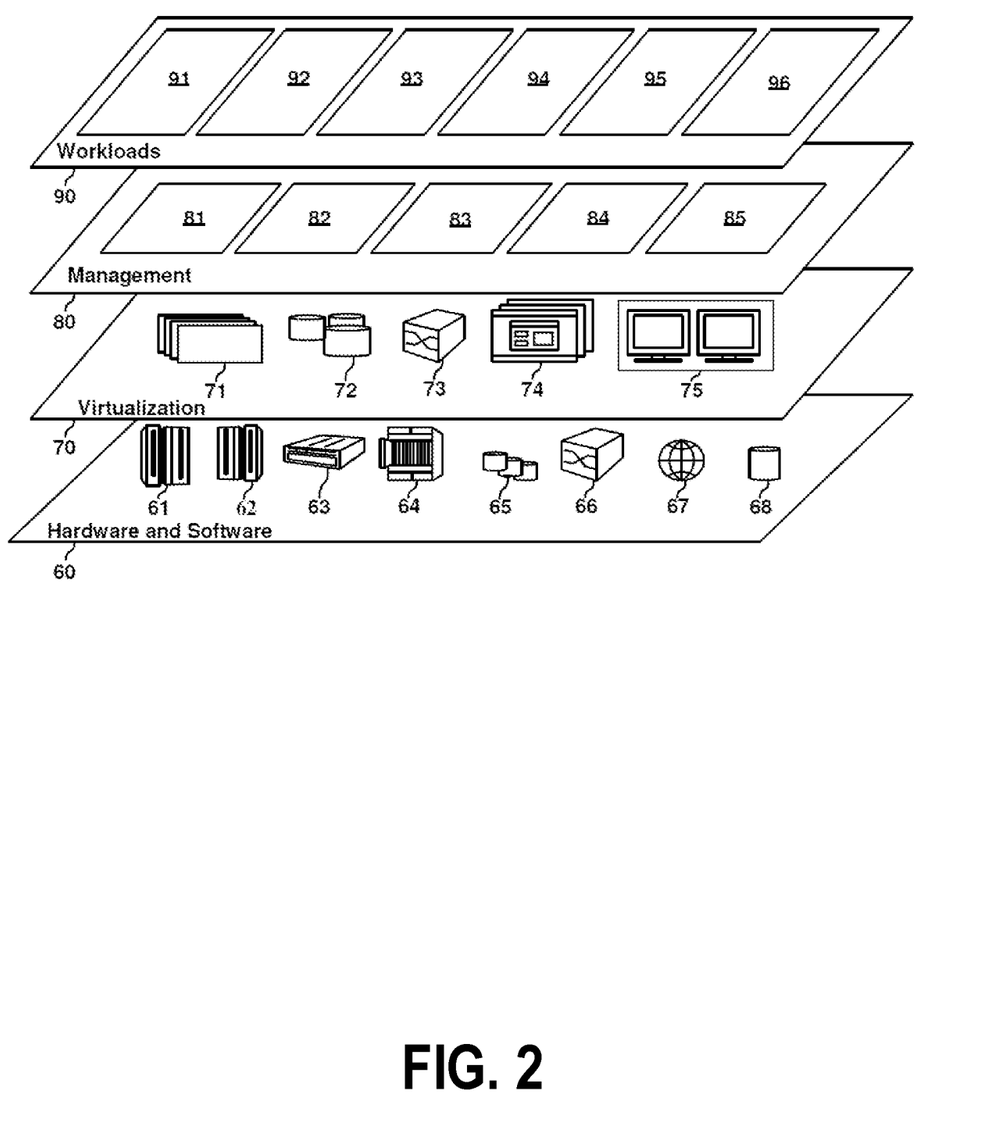
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of mechanisms 96 for virtual archiving of database records.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
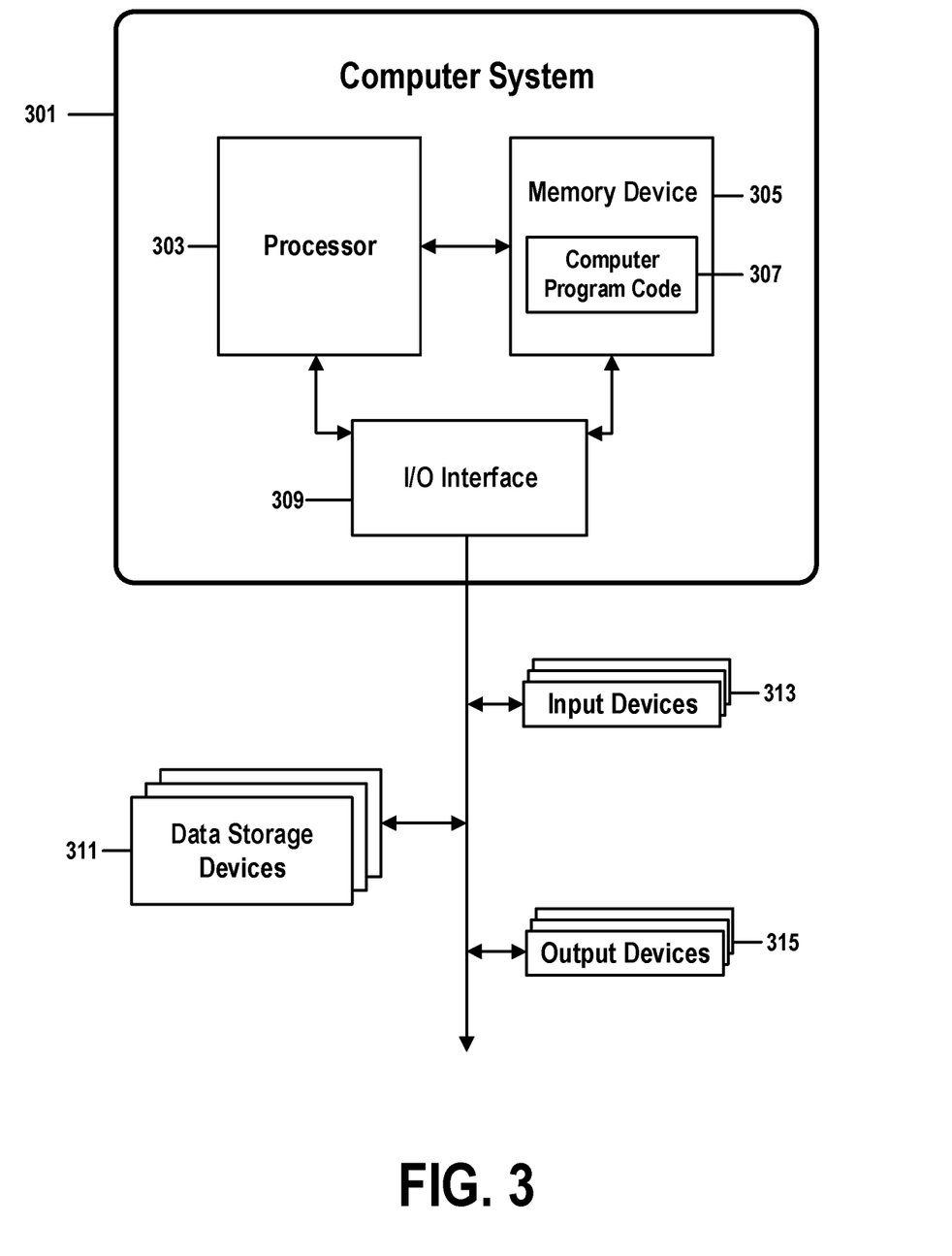
FIG. 3 shows the structure of a computer system and computer program code that may be used to implement a method for virtual archiving of database records in accordance with embodiments of the present invention.

FIG. 3 shows a structure of a computer system and computer program code that may be used to implement a method for virtual archiving of database records in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for virtual archiving of database records in accordance with embodiments of the present invention, and may implement other embodiments described in this specification, including the methods illustrated in FIGS. 1-7. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware, or may be accessed by processor 303 directly from such firmware, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for virtual archiving of database records.

Any of the components of the present invention could be created, integrated, hosted, maintained, deployed, managed, serviced, supported, etc. by a service provider who offers to facilitate a method for virtual archiving of database records. Thus the present invention discloses a process for deploying or integrating computing infrastructure, comprising integrating computer-readable code into the computer system 301, wherein the code in combination with the computer system 301 is capable of performing a method for virtual archiving of database records.

One or more data storage devices 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for virtual archiving of database records may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for virtual archiving of database records is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4A:
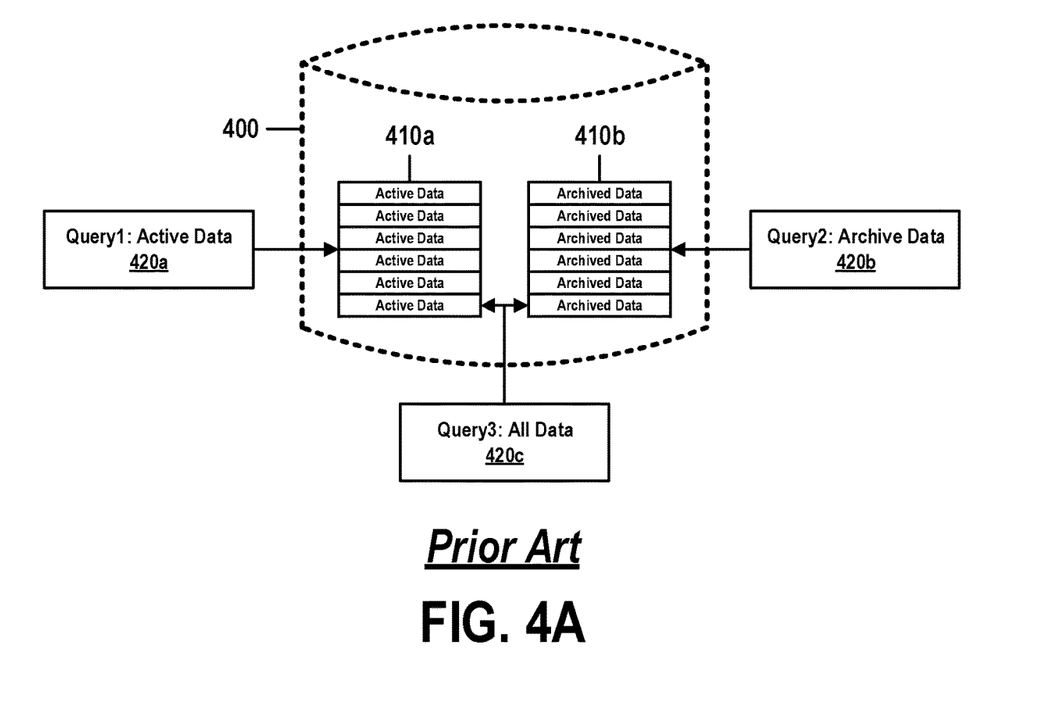
FIG. 4A shows a database-access mechanism used by known DBMSs to access active and archived database records.

FIG. 4A shows a database-access mechanism used by known database management systems (DBMSs) to access active and archived database records. FIG. 4A contains items 400-420c.

Known DBMSs 400 archive records of a database table 410a by moving those records to a distinct table (or other type of distinct data repository reserved for archived data) 410b, leaving active records in the original table 410a. Incoming SQL queries or other types of data-access requests 420a-420c then search through either the active-data table 410a, the archived-data table 410b, or both.

For example, Query1 420a requests access only to active data of table 410a. DBMS 400 services this query by accessing records stored in table 410a. Query2 420b requests access only to data of table 410a that has been archived to table 410b. DBMS 400 services Query2 420b by accessing records that have been archived to table 410b.

Query3 420c requests access to stored data regardless of whether that data is active or has been archived. In order to service Query3 420c, DBMS 400 must therefore join the contents of tables 410a and 410b prior to searching the merged data. This joining operation, like the partitioning operation that distributes records between two tables 410a and 410b, can consume valuable resources, thus reducing DBMS performance.

Figure 4B:
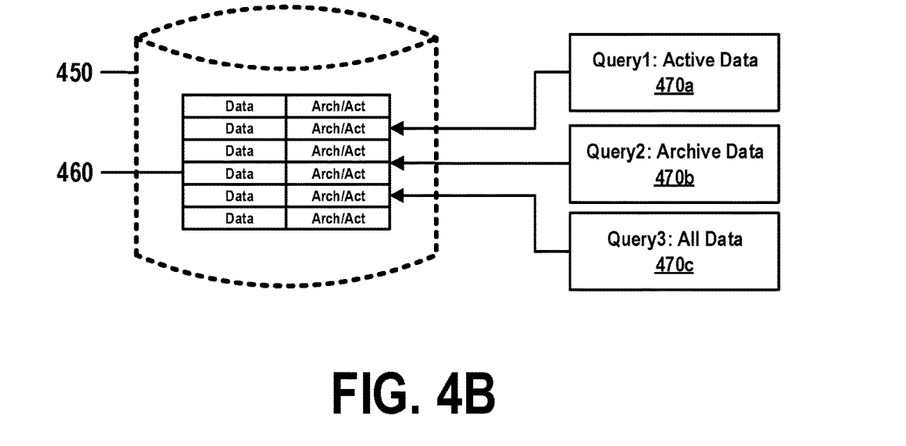
FIG. 4B shows a database-access mechanism used by an improved DBMS to access active and archived database records, in accordance with embodiments of the present invention.

FIG. 4B shows a database-access mechanism used by an improved DBMS to access active and archived database records, in accordance with embodiments of the present invention. FIG. 4B contains items 450-470c.

In the example of FIG. 4B, both active and archived records of a particular database table are stored in a single table 460. An "Archived" ID field or column is added to each record of table 460 in order to identify whether a record contains archived data. Unless an implementation-specific design constraint dictates otherwise, records are added to table 460 with an Archived field initialized to a default value that identifies the record as containing active data. Archiving a record of table 460 entails merely updating the Archived column to contain a value that identifies the record as containing archival data. No records are created, deleted, or moved during this improved archiving procedure.

With this mechanism, Queries 1-3 470a-470c (respectively analogous to queries 420a-420c) all access only the single table 460. Query1 470a, which access only active data, uses table 460's Archived field to access only records that contain an Archived value that specifies active data. Query2 470b, which access only archived data, uses table 460's Archived field to access only records that contain an Archived value that specifies archived data. Query3 470c, which requests access to both active and archived data, accesses records of table 460 regardless of the values stored in those records' Archived fields.

Figure 5:
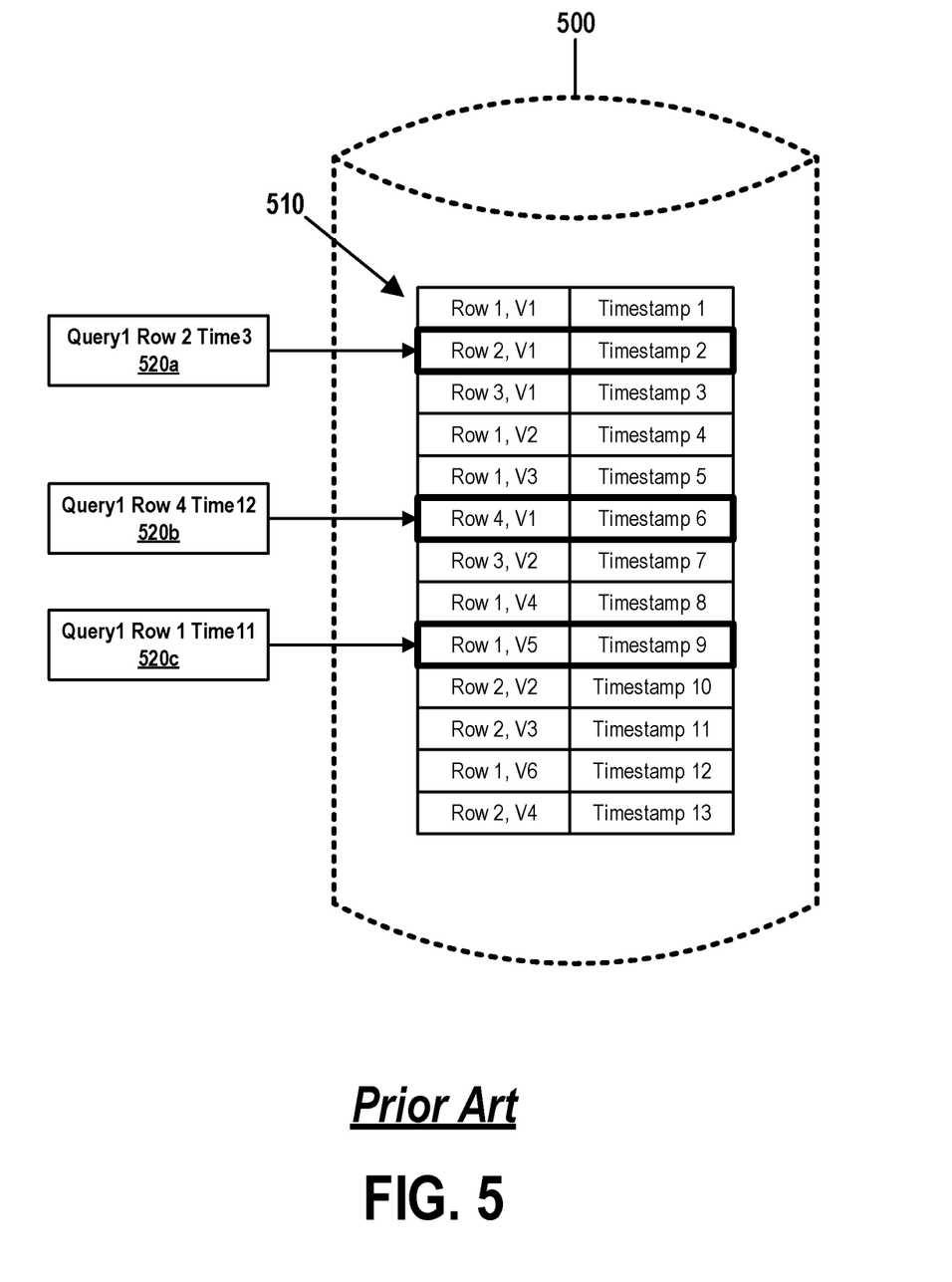
FIG. 5 illustrates a database-access mechanism used by known DBMSs that incorporate Multi-Version Concurrency Control (MVCC) technology.

FIG. 5 illustrates a database-access mechanism used by known DBMSs that incorporate Multi-Version Concurrency Control (MVCC) technology. FIG. 5 shows items 500-520c. Embodiments of the present invention may be implemented on DBMSs regardless of whether a DBMS uses an MVCC mechanism.

MVCC is a known database-storage strategy that improves DBMS performance when servicing concurrent database-access requests. Rather than updating a database record by deleting the record and then adding a new, updated version of that record, an MVCC-compliant DBMS merely adds the new updated record to the database. Both the original and the updated versions are time-stamped to indicate the exact time at which the record was updated. This reduces the overhead required to update a stored database record and the index leaf page that points to that record.

When multiple queries try to simultaneously access the same stored logical record, an MVCC-compliant DBMS uses the time stamps to decide which version of that record to make visible to each query. In this way, multiple queries each see only the latest version that existed when the query was submitted.

Embodiments of the present invention may improve the functioning of known DBMSs regardless of whether a DBMS uses MVCC. Embodiments may differ, however, in that an embodiment that improves a non-MVCC DBMS may incorporate additional functionality that provides some of the benefits provided by MVCC.

In the example of FIG. 5, DBMS 500 uses MVCC to maintain records of a database table 510. The figure shows versions of four rows Row 1 through Row 4, listed here in chronological order. Each record contains a timestamp field or column that identifies the order in which each record was created, such as by chronologically numbering each record as a function of each record's creation date or by recording the time and date at which that record was created.

For example, the first three rows of table 510 respectively show initial "V1" versions of Row 1, Row 2, and Row 3, the first three rows of table 510. Each of these rows' timestamp field identifies the time at which these records were added to table 510.

The next row of table 510 shows a "V2" updated version of Row 1. Timestamp 4 of this field identifies the time at which DBMS 500 updated the Row 1 V1 record in order to generate the Row 1 V2 record. In an MVCC-compliant system like DBMS 500, instead of replacing the Row 1 V1 record with the Row 1 V2 record, DBMS 500 instead merely adds the V2 record without deleting the V1 record. This improves performance, reduces latency, and reduces complexity.

Similar procedures have resulted in the storage of multiple timestamped versions of other rows of table 510. For example, V3-V6 versions of the Row 1 record have been added to table 510 in response to four more user requests to update the Row 1 record, resulting in the addition of four new records at timestamps 5, 8, 9, and 12. Similarly a record containing a V2 update of Row 2 was added to table 510 at timestamp 10 in response to a user request to update Row 2 of table 510.

When a submitted query requests access to a row of table 510, DBMS 500 makes visible to that request the latest version of the requested row that existed at the time the query was submitted (or, in some implementations, at the time that the query was received). For example, query 520*a* requests access to Row 2 at timestamp 3. Using each record's timestamp column, DBMS 500 determines that the latest Row 2 record created before timestamp 3 is the Row 2 V1 record created at timestamp 2. This procedure may be facilitated by designating the timestamp column to be an index of table 510.

Similarly, in response to receiving a request 520*b* to access Row 4 at timestamp 12, DBMS 500 determines that the most recently created version of Row 4 that existed at timestamp 12 is the Row 4 V1 record created at timestamp 6. And in response to receiving request 520*c* to access Row 1 at timestamp 11, DBMS 500 determines that the most recently created version of Row 1 that existed at timestamp 11 is the Row 1 V5 record created at timestamp 9.

Figure 7:
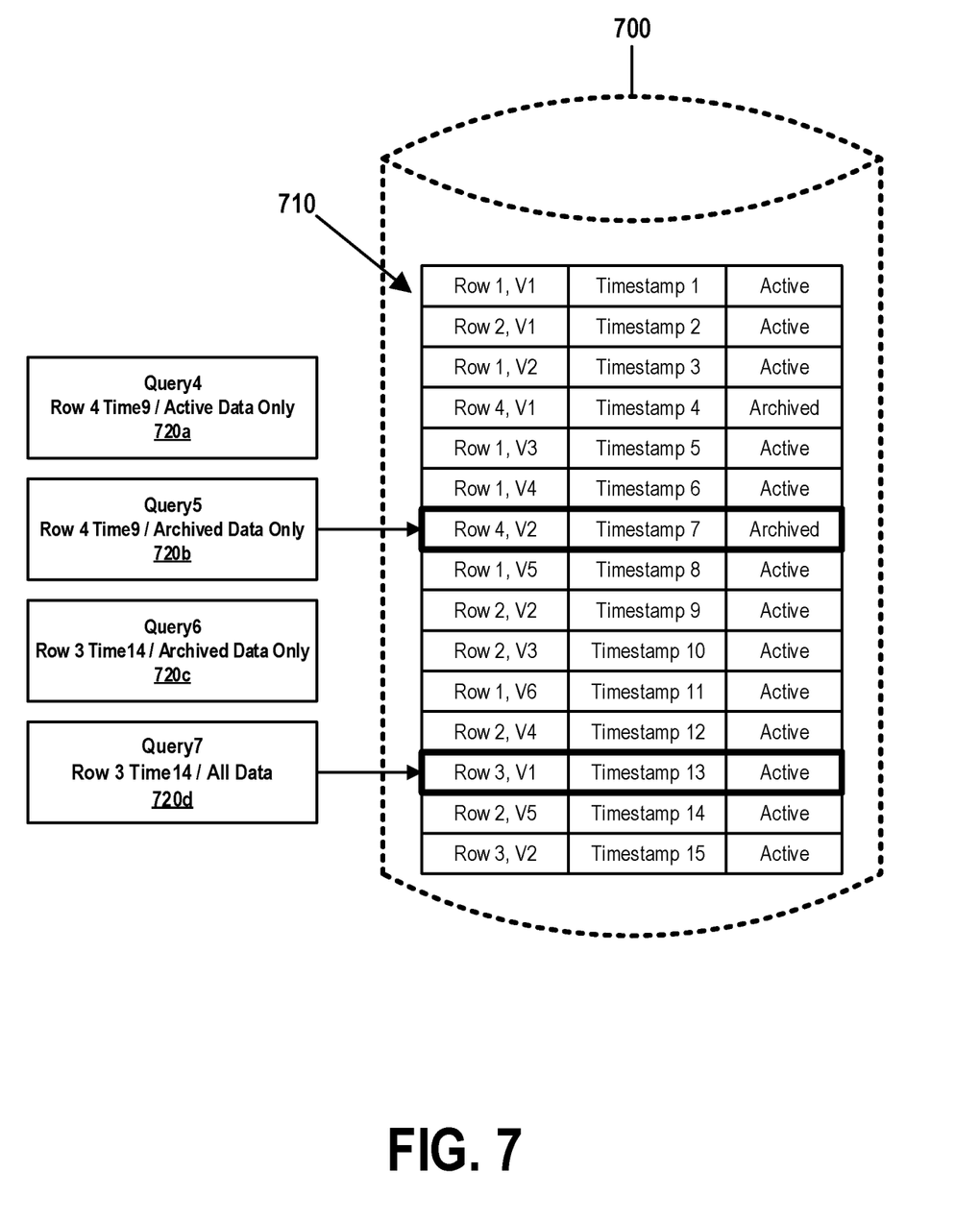
FIG. 7 illustrates an example of an embodiment of the present invention implemented on a DBMS that incorporates MVCC technology.

In this known method of MVCC, only active production data is stored in table 510. Archived data will have been moved to a separate partition. If any of the queries 520*a*-520*c* had requested access to both active and archived records, DBMS 500 would have had to combine the archived and active partitions prior to searching rows of table 510. In Structured Query Language (SQL) relational databases, this task may have required an operation similar to a resource-intensive SQL UNION ALL function. FIG. 7 shows an example of how embodiments of the present invention, when implemented on a DBMS that incorporates MVCC technology, improve this method of access by storing active and archived data in the same partition.

Figure 6:
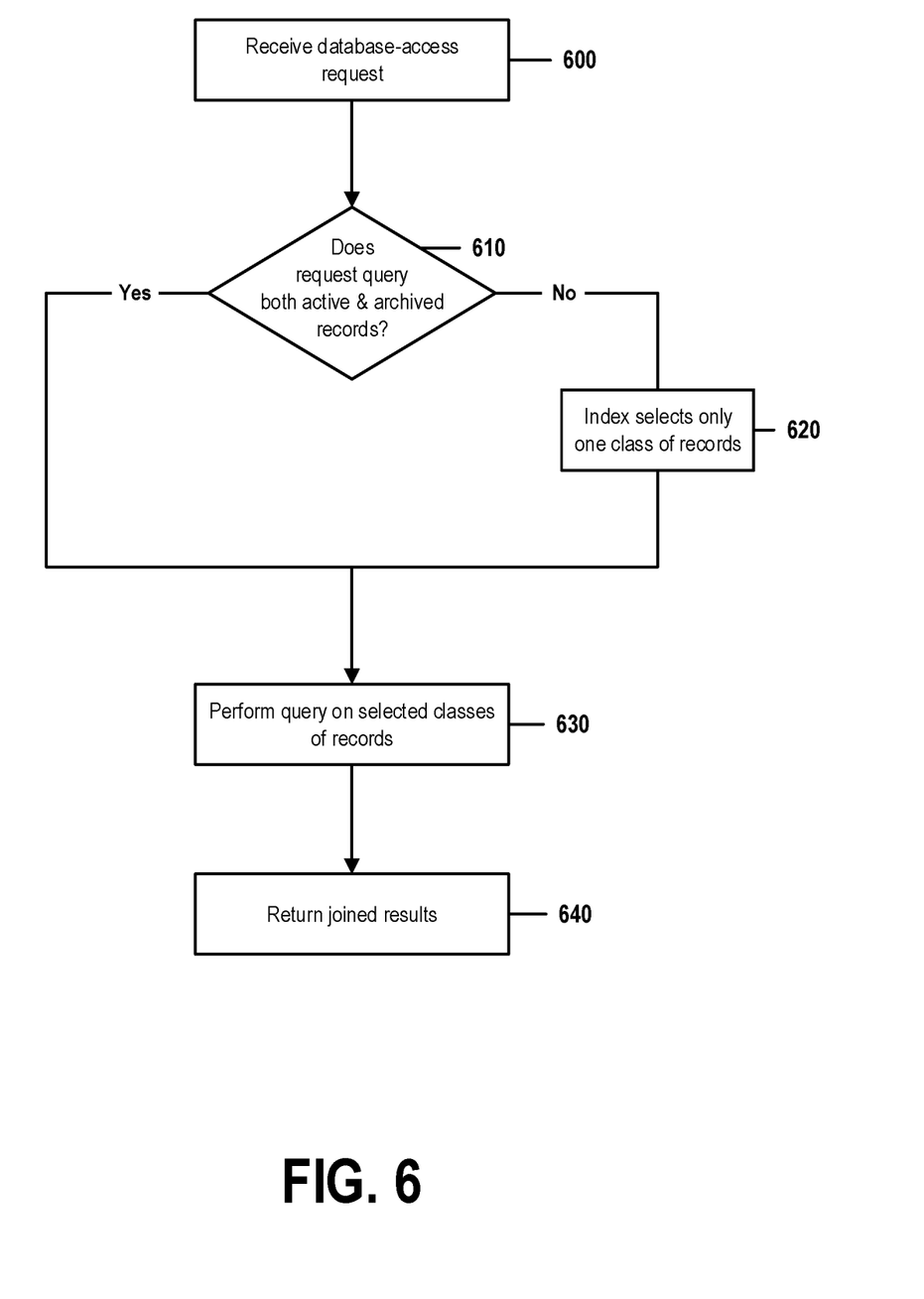
FIG. 6 is a flow chart that illustrates steps of a method for virtual archiving of database records in accordance with embodiments of the present invention.

FIG. 6 is a flow chart that illustrates steps of a method for virtual archiving of database records in accordance with embodiments of the present invention. FIG. 6 contains steps 600-640.

In step 600, a DBMS improved in accordance with embodiments of the present invention receives an SQL query or other request for access to records a table of the database managed by the DBMS.

If the DBMS does not incorporate MVCC technology, each record of the table will have been modified in a manner similar to that of table 460's records, as described in FIG. 4B. If the DBMS does incorporate MVCC technology, each record of the table may have been modified in a manner similar to that of exemplary table 710's records, as shown FIG. 7.

In either case, this modification may comprise adding an "Archived" field or column to each record that identifies whether the record contains active data or archived data. If preferred by an implementer, a functionally similar mechanism may be implemented that does not require modification to a database schema. For example, a row may be marked as containing archived data by assigning an unexpected or otherwise distinguishing value to a column that is known in the art to already exist in such a record.

For example, an embodiment may mark a row as having been archived by assigning a negative value to that row's Partition ID field, such as a timestamp value that is less than zero. Such a convention would allow the DBMS to determine the chronological order of records archived in this manner without requiring the database schema to be modified by the addition of a new column. In another example, rows may be marked as having been archived by assigning to each row a timestamp value within a range of values that is known to be greater than any timestamp of a non-archived row.

In step 610, the DBMS determines whether the data-access request received in step 600 requests access to archived data, active data, or both. If both, the DBMS proceeds directly to step 630. Otherwise, the DBMS performs step 620 before proceeding to step 630.

Step 610 may be implemented by any known DBMS mechanism capable of parsing instructions the incoming query to select only database records that satisfy a particular condition. In examples and embodiments described in this document, that parsing might, for example, comprise evaluating an SQL WHERE statement that limits query results to only those records that contain a certain value of column Archived that identifies each record's data as being either "archived" or "active".

In step 620, the DBMS, through means known in the art of database-management, sets its search criteria to retrieve only those records that contain a certain value of the Archived field. For example, if the DBMS in step 610 identified that the incoming query requests a result set that consists of active data, a query optimizer, or other component of the DBMS, would in step 620 formulate a query plan that returned a record only if that record's Archived field contains a value identifying the record as being active data. Similarly, if the DBMS in step 610 identified that the incoming query requests a result set that consists of only archived data, the DBMS in step 620 would select a record only if that record's Archived field contains a value identifying the record as having been archived.

This step may be performed by any means known in the art. For example, a query optimizer may direct the DBMS to generate a result set by means of a conventional indexed search where the Archived field is used as an index to limit the result set to either active or archived records. If the DBMS in step 610 requested results selected from both active and archived records, the query optimizer's action plan need not specify a particular value of the Archived index. In that case, step 620 need not be performed.

In step 630, the DBMS continues to implement the query action plan in a manner similar to the manner in which known DBMSs perform tasks specified by an action plan. However, this step performs tasks distinct from those by which a known DBMS would service the data-access request because the improved action plan generated by the method of FIG. 6 specifies the table's Archived field as an additional index.

If, for example, the data-access request had specified that a result set be selected from both active and archived records, a known DBMS would implement a query action plan that first joined records of FIG. 4A's active and archive tables 410*a* and 410*b* before searching the joined result. However, the improved DBMS of the present invention would instead implement an action plan that considers all records of FIG. 4B's single, unified table 460.

Similarly, if the data-access request had limited a result set to only archived data, a known DBMS would have generated an access plan that directs the DBMS to search only the archived records of FIG. 4A's table 410b. And if the data-access request had specified a result set consisting of only active records, a known DBMS would implement an access plan that considers only the active records of FIG. 4A's table 410a. But in both these latter cases, the improved DBMS of the present invention would access only a subset of the records in merged table 460, using the Archived index to limit the result set to either archived records or active records.

In step 640, the DBMS returns the results produced by servicing the data-access request received in step 600. Given the query action plan generated in previous steps of FIG. 6, this result set may be returned through any means known in the art.

FIG. 7 shows a more detailed example of how the method of FIG. 6 may be adapted to DBMSs that incorporate MVCC technology.

FIG. 7 illustrates an example of an embodiment of the present invention implemented on a DBMS that incorporates MVCC technology. FIG. 7 shows items 700-720d.

Database 700 contains an enhanced version 710 of the MVCC-compliant database table 510 of FIG. 6. Each record of enhanced table 710 contains both the MVCC timestamp field shown in table 510 and the present invention's Archived column or field shown in FIG. 4's table 460. As described in FIG. 5, embodiments of the present invention may use other methods of denoting that a record contains archived data, such as by storing a negative value in the record's Partition ID column, or by identifying the record with a timestamp value that falls within a certain range.

The improved DBMS thus considers the value of each record's timestamp identification, as described in FIG. 5, in order to determine which version of a particular row of table 710 should be visible to a particular query, thus implicitly determining which records have been archived. In certain embodiments, the improved DBMS may consider the value of each record's Archived column, as described in FIGS. 4B, and 6, in order to determine whether each record contains archived or active data.

For example, Query4 720a, which requests access to Row 4 of table 710, was submitted at timestamp 9 and limits its result set to active data. Because Row 4 has been archived, the DBMS would return no results.

Query5 720b, however, requests access to Row 4 of table 710 at timestamp 9, but limits the result set to records containing archived data. The latest record of archived Row 4 data that existed at timestamp 9 is the archived record at timestamp 7, which contains the V2 version of Row 4. The DBMS would thus return a result set that contains the timestamp 7 record. Note that, if Query5 720b had been submitted at the time specified by timestamp 6, the query would have instead returned the record at timestamp 4, which would have been the latest record containing archived Row 4 data at the time that the query was submitted.

Query6 720c requests access to Row 3 at timestamp 14, and limits results to archived data. Because Row 3 has not been archived, the DBMS responds to this query with an empty result set. If Query6 720c had requested active Row 3 records at any time later than the time specified by timestamp 13, the system would have returned the appropriate archived Row 3 record at either timestamp 13 or timestamp 15.

Finally, Query7 720d requests access to Row 3 at timestamp 14, but does not limit results to either archived or active data. The latest version of Row 3 that exists at timestamp 14, archived or not, is the active-data record at timestamp 13, which contains the V1 version of Row 3. In this example, the DBMS would retrieve the active timestamp 13 record.

The same result set, consisting of only the timestamp 13 record, would have been returned if Query 7 720d had limited its result set to active-data records. In this case, certain embodiments would have executed a query action plan that first selected only active records either by scanning each row's Archived column or by inferring whether a record was active or archived by analyzing timestamps, metadata, or other information generated by the MVCC mechanism. The DBMS would then have chosen the timestamp 13 record from resulting subset of active records, as being the latest version of Row 3 that contained active data at timestamp 14. In other embodiments, this procedure could be reversed, where the DBMS first identifies a subset of records that contain active Row 3 data and then selecting the most-recent version of Row 3 from the subset. Yet other embodiments use information recorded by the MVCC mechanism to determine, as required in order to service the query, both: i) whether the requested table row has been archived and ii) which record is the most recent record that contains data of the requested row.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A database-management system (DBMS) system comprising a processor, a memory coupled to the processor, and a computer-readable hardware storage device coupled to the processor, the storage device containing program code configured to be run by the processor via the memory to implement a method for virtual archiving of database records, the method comprising:

the DBMS receiving a request to retrieve a result set comprising records stored in a table of a database,
where each record of the table contains an Archived column that specifies whether the record contains an active class of data or an archival class of data, and
where a negative date value stored in an Archived column of a first record of the table indicates that the first record was created on a date identified by an absolute value of the negative date value and further specifies that the first record contains an archival class of data;

the DBMS identifying whether the request limits the result set to active data or to archival data;

the DBMS, responsive to determining that the result set is limited to active data, returning only records identified by a value of the Archived column as storing active data;

the DBMS, responsive to determining that the result set is limited to archival data, returning only records identified by a value of the Archived column as storing archival data; and the DBMS, responsive to determining that the request does not limit the result set to either active or archival data, returning records regardless of a value stored in each returned record's Archived column.

2. The system of claim 1, further comprising:
the DBMS, when adding a new record to the table, initializing the new record's Archived column to a value indicating that the new record contains active data.

3. The system of claim 1, further comprising:
the DBMS archiving an existing record of the table by updating the existing record's Archived column to a value indicating that the existing record now contains archival data.

4. The system of claim 3, where the archiving is performed without migrating the existing record to an archival storage area that is distinct from the table.

5. The system of claim 1, where the DBMS services the request by performing an indexed search of the table that uses the Archived column as an index.

6. The system of claim 1, where the DBMS incorporates Multi-Version Concurrency Control (MVCC) technology, further comprising:
the DBMS determining from information recorded by the MVCC technology whether each record of the table has been archived.

7. The system of claim 1, where the DBMS incorporates Multi-Version Concurrency Control (MVCC) technology, further comprising:
the DBMS initially selecting a subset of records of the table that are identified by the MVCC-technology's version-tracking mechanism as including a latest version of a particular row of the table that had existed when the request was received; and
the DBMS deleting from the subset any records identified by information recorded by the MVCC technology as containing a class of data not specified by the request, where the class of data is selected from the group consisting of archived data and active data.

8. A method for virtual archiving of database records, the method comprising:
a database-management system (DBMS) system receiving a request to retrieve a result set comprising records stored in a table of a database,
where each record of the table contains an Archived column that specifies whether the record contains an active class of data or an archival class of data, and
where a negative date value stored in an Archived column of a first record of the table indicates that the first record was created on a date identified by an absolute value of the negative date value and further specifies that the first record contains an archival class of data;
the DBMS identifying whether the request limits the result set to active data or to archival data;
the DBMS, responsive to determining that the result set is limited to active data, returning only records identified by a value of the Archived column as storing active data;
the DBMS, responsive to determining that the result set is limited to archival data, returning only records identified by a value of the Archived column as storing archival data; and
the DBMS, responsive to determining that the request does not limit the result set to either active or archival data, returning records regardless of a value stored in each returned record's Archived column.

9. The method of claim 8, further comprising:
the DBMS, when adding a new record to the table, initializing the new record's Archived column to a value indicating that the new record contains active data.

10. The method of claim 8, further comprising:
the DBMS archiving an existing record of the table by updating the existing record's Archived column to a value indicating that the existing record now contains archival data.

11. The method of claim 10, where the archiving is performed without migrating the existing record to an archival storage area that is distinct from the table.

12. The method of claim 8, where the DBMS incorporates Multi-Version Concurrency Control (MVCC) technology, further comprising:
the DBMS determining from information recorded by the MVCC technology whether each record of the table has been archived.

13. The method of claim 8, where the DBMS incorporates Multi-Version Concurrency Control (MVCC) technology, further comprising:
the DBMS initially selecting a subset of records of the table that are identified by the MVCC-technology's version-tracking mechanism as including a latest version of a particular row of the table that had existed when the request was received; and
the DBMS deleting from the subset any records identified by information recorded by the MVCC technology as containing a class of data not specified by the request, where the class of data is selected from the group consisting of archived data and active data.

14. The method of claim 8, further comprising providing at least one support service for at least one of creating, integrating, hosting, maintaining, and deploying computer-readable program code in the computer system, wherein the computer-readable program code in combination with the computer system is configured to implement the receiving, the identifying, and the returning.

15. A computer program product for a database-management system (DBMS), the computer program product comprising a computer readable storage medium having program instructions embodied therewith, the program instructions executable by a processor to cause the processor to perform a method for virtual archiving of database records, the method comprising:
the DBMS receiving a request to retrieve a result set comprising records stored in a table of a database,
where each record of the table contains an Archived column that specifies whether the record contains an active class of data or an archival class of data, and
where a negative date value stored in an Archived column of a first record of the table indicates that the first record was created on a date identified by an absolute value of the negative date value and further specifies that the first record contains an archival class of data;
the DBMS identifying whether the request limits the result set to active data or to archival data;
the DBMS, responsive to determining that the result set is limited to active data, returning only records identified by a value of the Archived column as storing active data;

the DBMS, responsive to determining that the result set is limited to archival data, returning only records identified by a value of the Archived column as storing archival data; and the DBMS, responsive to determining that the request does not limit the result set to either active or archival data, returning records regardless of a value stored in each returned record's Archived column.

16. The computer program product of claim 15, further comprising:

the DBMS, when adding a new record to the table, initializing the new record's Archived column to a value indicating that the new record contains active data.

17. The computer program product of claim 15, further comprising:

the DBMS archiving an existing record of the table by updating the existing record's Archived column to a value indicating that the existing record now contains archival data.

18. The computer program product of claim 17, where the archiving is performed without migrating the existing record to an archival storage area that is distinct from the table.

19. The computer program product of claim 15, where the DBMS incorporates Multi-Version Concurrency Control (MVCC) technology, further comprising:

the DBMS determining from information recorded by the MVCC technology whether each record of the table has been archived.

20. The computer program product of claim 15, where the DBMS incorporates Multi-Version Concurrency Control (MVCC) technology, further comprising:

the DBMS initially selecting a subset of records of the table that are identified by the MVCC-technology's version-tracking mechanism as including a latest version of a particular row of the table that had existed when the request was received; and the DBMS deleting from the subset any records identified by information recorded by the MVCC technology as containing a class of data not specified by the request, where the class of data is selected from the group consisting of archived data and active data.

* * * * *